(12) United States Patent
Yu et al.

(10) Patent No.: US 11,520,024 B2
(45) Date of Patent: Dec. 6, 2022

(54) AUTOMATIC AUTONOMOUS VEHICLE AND ROBOT LIDAR-CAMERA EXTRINSIC CALIBRATION

(71) Applicant: NIO Technology (Anhui) Co., Ltd., Anhui (CN)

(72) Inventors: Hiu Hong Yu, Alameda, CA (US); Tong Lin, Cupertino, CA (US); Xu Chen, Livermore, CA (US); Zhenxiang Jian, Sunnyvale, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 181 days.

(21) Appl. No.: 16/726,581

(22) Filed: Dec. 24, 2019

(65) Prior Publication Data

US 2021/0190922 A1 Jun. 24, 2021

(51) Int. Cl.
*G01S 7/497* (2006.01)
*G01S 17/89* (2020.01)
*G05D 1/00* (2006.01)

(52) U.S. Cl.
CPC ............ *G01S 7/497* (2013.01); *G01S 17/89* (2013.01); *G05D 1/0088* (2013.01); *G05D 2201/0213* (2013.01)

(58) Field of Classification Search
CPC .. G01S 7/497; G01S 17/89; G01S 2013/9316; G01S 2013/9318;
(Continued)

(56) References Cited

U.S. PATENT DOCUMENTS

| 6,460,004 B2 | 10/2002 | Greer et al. |
| 9,201,424 B1 | 12/2015 | Ogale |

(Continued)

FOREIGN PATENT DOCUMENTS

| CN | 100524108 | 8/2009 |
| CN | 107918113 | 4/2018 |

(Continued)

OTHER PUBLICATIONS

U.S. Appl. No. 16/708,032, filed Dec. 9, 2019, Jian et al.
(Continued)

*Primary Examiner* — Elaine Gort
*Assistant Examiner* — Ellis B. Ramirez
(74) *Attorney, Agent, or Firm* — Sheridan Ross P.C.

(57) ABSTRACT

Extrinsic calibration of a Light Detection and Ranging (LiDAR) sensor and a camera can comprise constructing a first plurality of reconstructed calibration targets in a three-dimensional space based on physical calibration targets detected from input from the LiDAR and a second plurality of reconstructed calibration targets in the three-dimensional space based on physical calibration targets detected from input from the camera. Reconstructed calibration targets in the first and second plurality of reconstructed calibration targets can be matched and a six-degree of freedom rigid body transformation of the LiDAR and camera can be computed based on the matched reconstructed calibration targets. A projection of the LiDAR to the camera can be computed based on the computed six-degree of freedom rigid body transformation.

20 Claims, 13 Drawing Sheets

(58) Field of Classification Search
CPC ... G01S 2013/93185; G01S 2013/9319; G01S 2013/932; G01S 2013/9322; G01S 2013/93271; G01S 2013/93272; G01S 2013/93273; G01S 2013/93274; G01S 2013/93277; G01S 15/931; G01S 17/86; G01S 17/931; G01S 7/40; G01S 7/4086; G01S 13/865; G05D 1/0088; G05D 2201/0213
USPC .................................. 701/534, 33.1; 702/85
See application file for complete search history.

(56) References Cited

U.S. PATENT DOCUMENTS

| | | | |
|---|---|---|---|
| 9,933,515 | B2 | 4/2018 | Prokhorov |
| 9,952,317 | B2 | 4/2018 | Valois et al. |
| 9,965,870 | B2 | 5/2018 | Claveau et al. |
| 2015/0070207 | A1 | 3/2015 | Millar et al. |
| 2015/0317781 | A1* | 11/2015 | Napier ............... G01S 7/497 348/46 |
| 2015/0362587 | A1 | 12/2015 | Rogan et al. |
| 2017/0124781 | A1 | 5/2017 | Douillard et al. |
| 2017/0212215 | A1 | 7/2017 | Hellinger et al. |
| 2018/0231654 | A1 | 8/2018 | Bilik et al. |
| 2019/0012808 | A1* | 1/2019 | Mou ............... G01S 7/4817 |
| 2019/0094347 | A1 | 3/2019 | Singh |
| 2019/0122386 | A1* | 4/2019 | Wheeler ............ G01C 25/00 |
| 2020/0150677 | A1* | 5/2020 | Walters ............. G05D 1/0206 |
| 2020/0158840 | A1 | 5/2020 | Ikram et al. |
| 2020/0175864 | A1 | 6/2020 | Solmaz et al. |
| 2020/0363501 | A1* | 11/2020 | Lau ..................... G01S 7/40 |
| 2021/0004985 | A1 | 1/2021 | Lee et al. |
| 2021/0192788 | A1* | 6/2021 | Diederichs ........... G01S 17/86 |
| 2021/0216151 | A1 | 7/2021 | Techerniak et al. |
| 2022/0018935 | A1 | 1/2022 | Jefferies et al. |
| 2022/0171060 | A1 | 6/2022 | Zhu |

FOREIGN PATENT DOCUMENTS

| | | |
|---|---|---|
| CN | 109374003 | 2/2019 |
| KR | 20180131033 | 12/2018 |
| WO | WO 2016/133875 | 8/2016 |
| WO | WO 2018/217708 | 11/2018 |

OTHER PUBLICATIONS

Gao et al., "On-line Calibration of Multiple LIDARs on a Mobile Vehicle Platform," Proceedings—IEEE International Conference on Robotics and Automation, Jun. 2010, conference paper, DOI: 10.1109/ROBOT.2010.5509880, 6 pages.

Jiao et al., "Automatic Calibration of Multiple 3D LiDARs in Urban Environments," Cornell University-Computer Science-Robotics, arXiv:1905.04912v1 [cs.RO] May 13, 2019, paper, 7 pages.

U.S. Appl. No. 16/780,122, filed Feb. 3, 2020, Yu et al..

Chai et al., "A Novel Method for LiDAR Camera Calibration by Plane Fitting," Proceedings of the 2018 IEEE/SME International, Conference on Advanced Intelligent Mechatronics (AIM), Auckland, New Zealand, Jul. 9-12, 2018, 6 pages.

Dhall et al., "LiDAR-Camera Calibration using 3D-3D Point correspondences," May 27, 2017, arXiv.org > cs > arXiv:1705.09785v1, 19 pages.

Lyu et al., "An Interactive LiDAR to Camera Calibration," IEEE High Performance Extreme Computing Conference (HPEC), Sep. 24-26, 2019, arXiv:1903.01122v1 [eess.IV], Mar. 6, 2019, 6 pages.

Shi et al., "Extrinsic Calibration and Odometry for Camera—LiDAR Systems," IEEE Access, Aug. 27, 2019, vol. 7, pp. 120106-120116.

Official Action for U.S. Appl. No. 16/780,122, dated May 20, 2022 27 pages.

Official Action for U.S. Appl. No. 16/780,122, dated Sep. 8, 2022 20 pages.

* cited by examiner

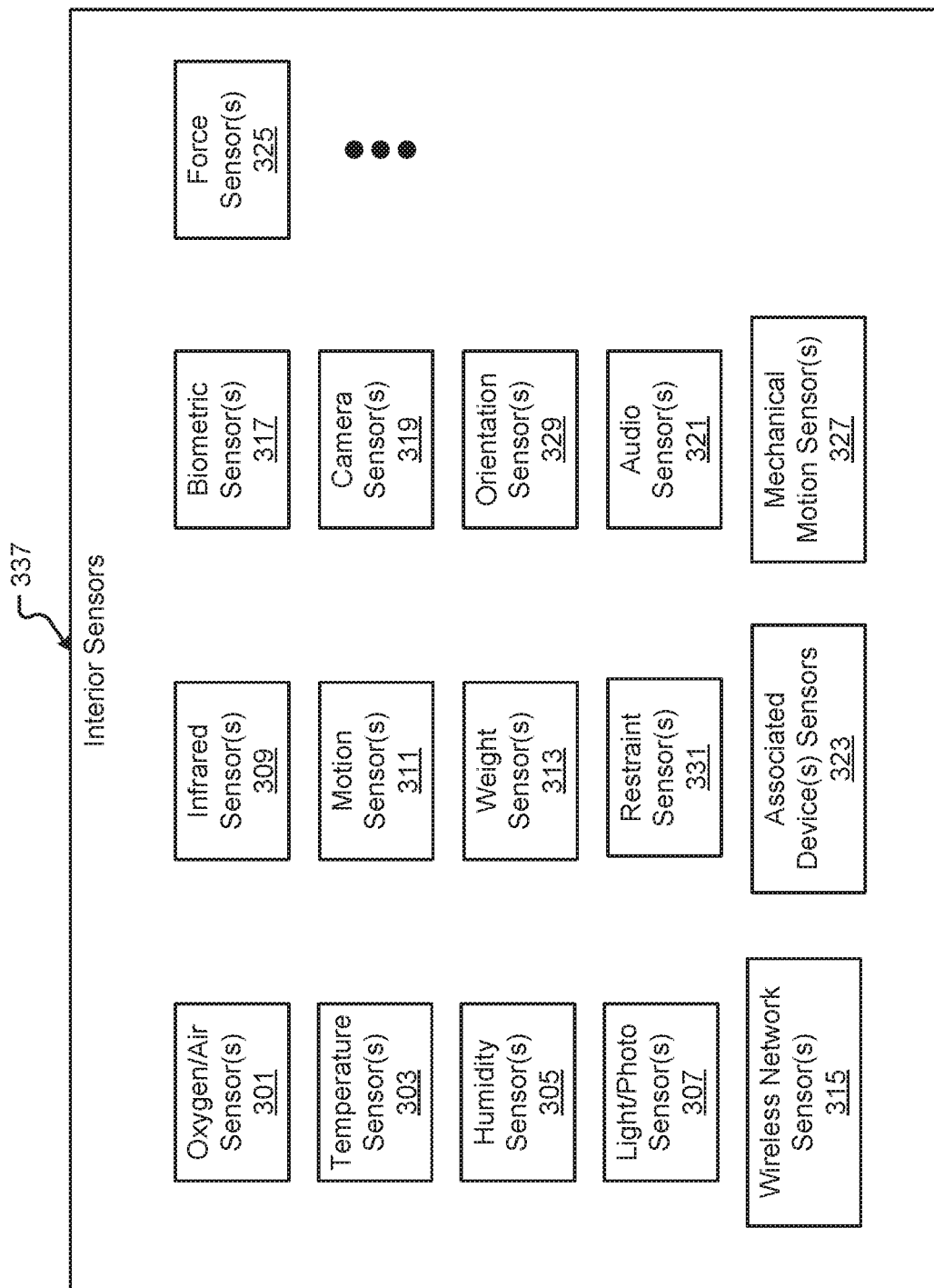

AUTOMATIC AUTONOMOUS VEHICLE AND ROBOT LIDAR-CAMERA EXTRINSIC CALIBRATION

FIELD

The present disclosure is generally directed to autonomous machine navigation systems and more particularly to systems and methods for extrinsic calibration of LiDAR and camera sensors used for navigation of an autonomous machine.

BACKGROUND

For a variety of autonomous machines, such as automobiles, drones, aircraft, and other vehicles, robots, etc., safety and accuracy can be improved by combining different sensor inputs, e.g., Light Detection and Ranging (LiDAR) and cameras, to make use of the different characteristics of each type of sensor. However, different sensors report information with respect to a local coordinate system which may not match. Accordingly, extrinsic sensor calibration can be performed to convert all sensor data from the local coordinate of each to a global coordinate system so that the navigation system of the machine can have a single reference point.

Currently, the standard approach to extrinsic sensor calibration is to scan a standard checkerboard with the LiDAR and camera systems when the checkerboard is placed at a known location relative to the vehicle or machine. Based on the data captured from each sensor, the intersection of the checkers can then be extracted based on a strongest change of point intensity and a strongest change of pixel gradient for LiDAR and camera respectively and used to align the coordinate systems of the individual sensors. This method is useable if the LiDAR provides accurate intensity information, since LiDAR does not provide Red Green Blue (RGB) color values. Additionally, this approach requires precise placement of the checkerboard relative to the vehicle and therefore complicates setup. Another approach is using LiDAR to scan a pre-cut rectangular board and a camera systems to obtain an image, extracting the rectangle from the three-dimensional LiDAR point cloud using the Random Sample Consensus (RANSAC) algorithm, and detecting the rectangular board from the image. However, the limitation of this approach is that the boundary of the rectangular board must be detected/extracted accurately and can be prone to errors. Yet another current approach is to scan a diamond shape board having visual markers, such as Aruco markers, on one of the corners. The camera can detect and estimate the three-dimensional position of the center of the Aruco marker relative to the camera system using an Aruco library. A six-degree-of-freedom transformation is then estimated by doing a three-dimensional to three-dimensional transformation. However, such approach requires manually extracting the boundary of the targets. Moreover, a single Aruco marker will not provide accurate 3D position estimation and normal surface of the marker on the board. Hence, there is a need for improved systems and methods for extrinsic calibration of sensors used for navigation of an autonomous machine.

BRIEF DESCRIPTION OF THE DRAWINGS

FIG. 3B is a block diagram of an embodiment of interior sensors within the vehicle in accordance with embodiments of the present disclosure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
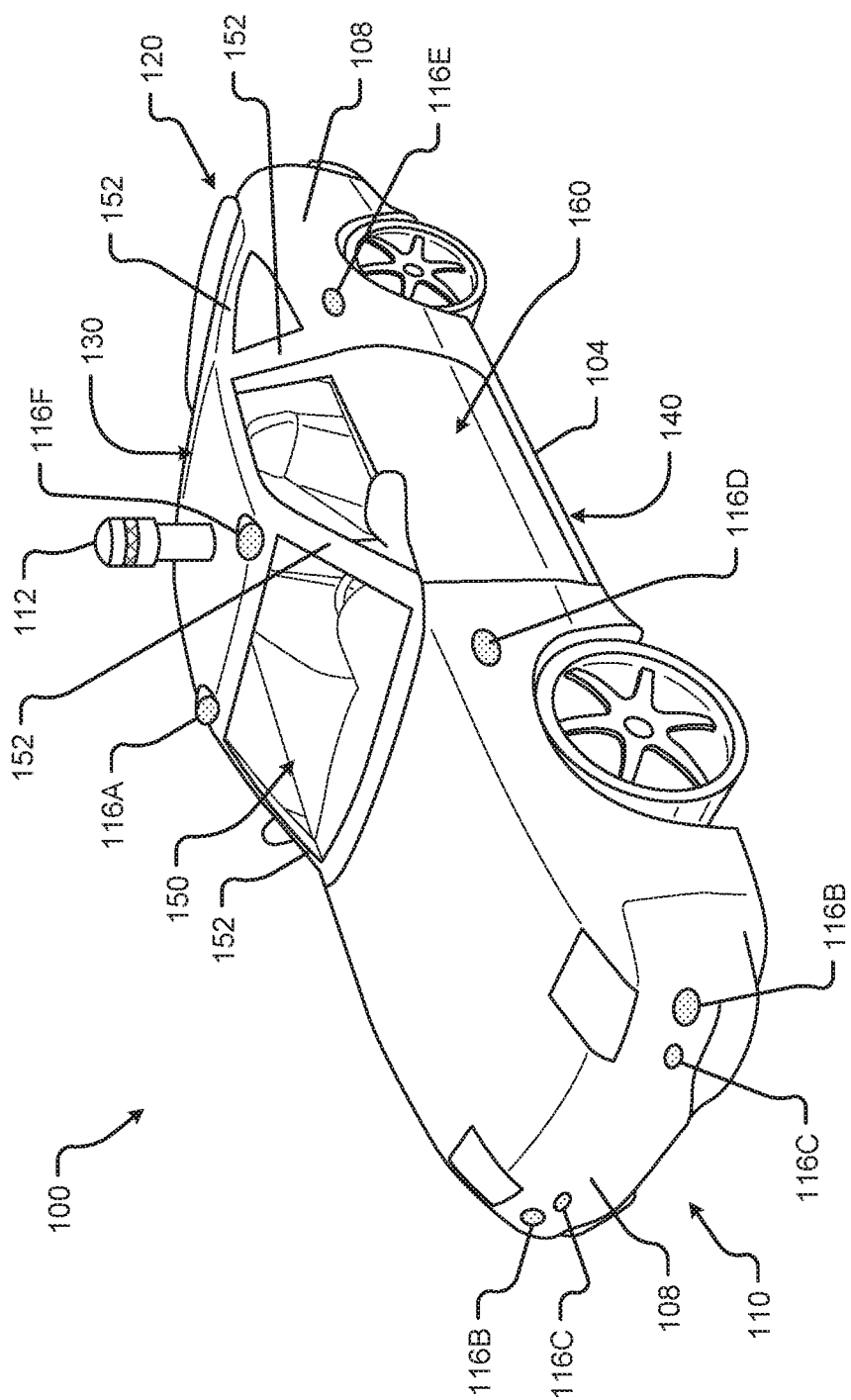
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
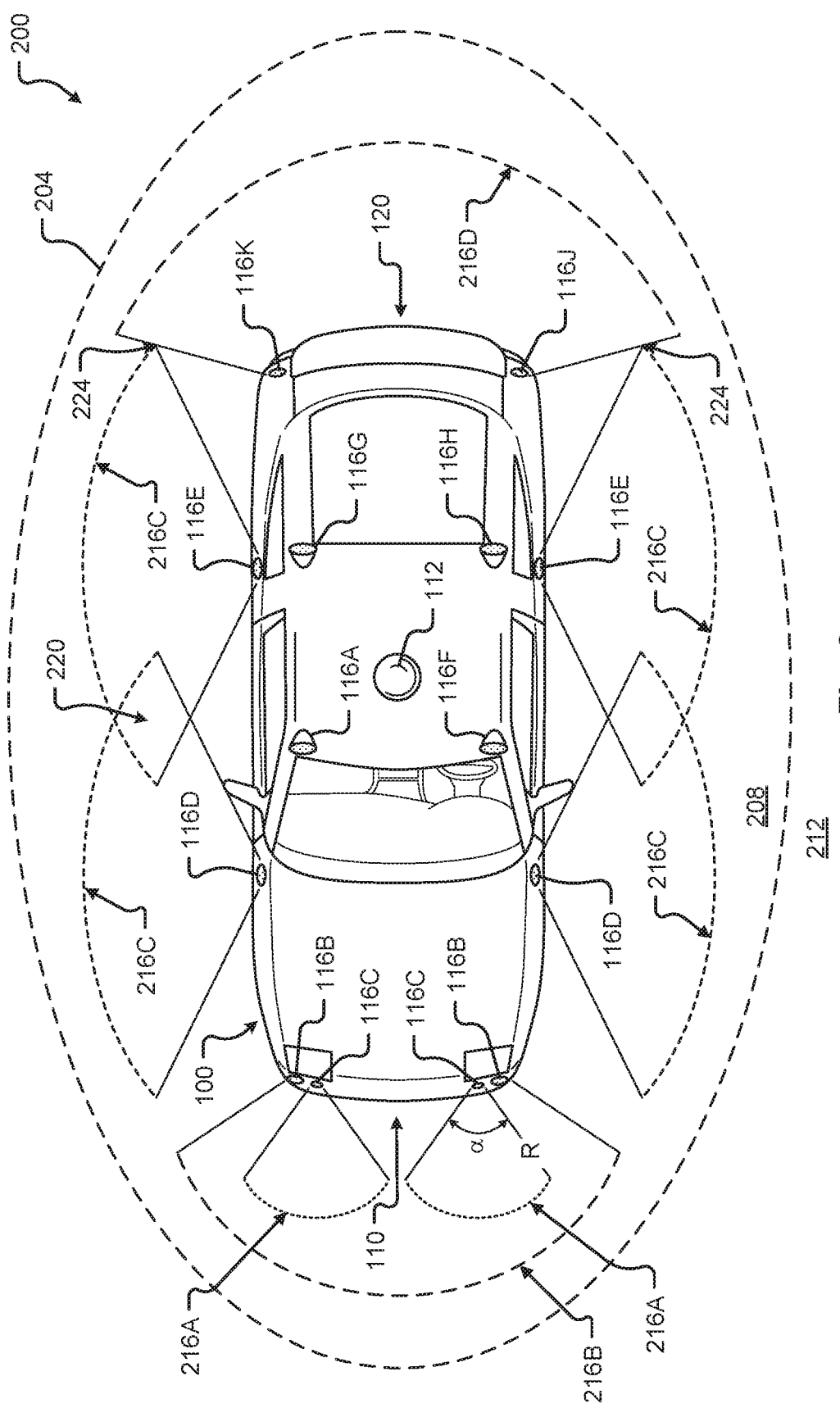
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 1167, 116K) may meet at a virtual intersection point 224.

The vehicle 100 may include a number of sensors 116E, 116G, 116H, 1167, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
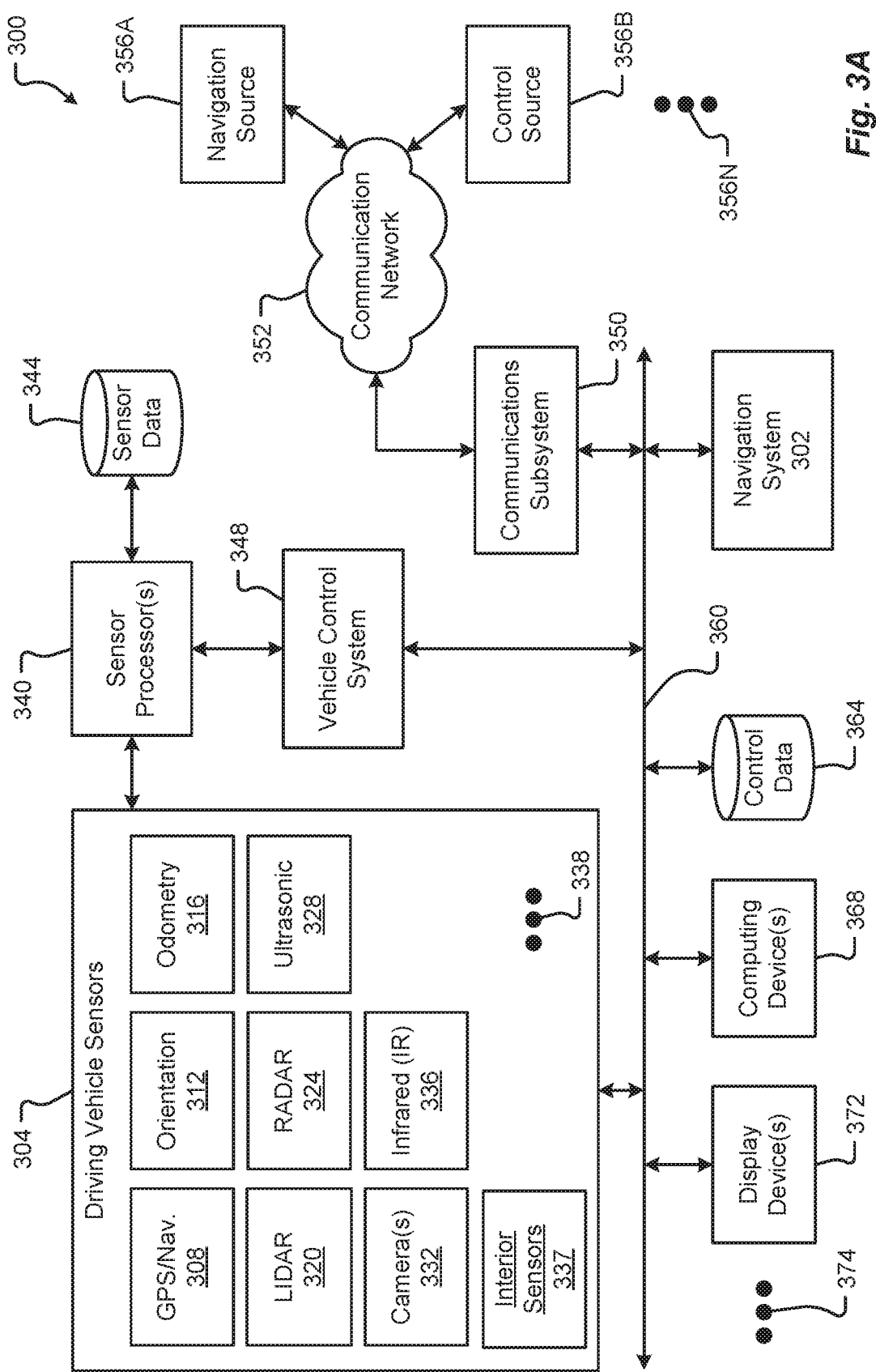
FIG. 3A is a block diagram of an embodiment of a communication environment of the vehicle in accordance with embodiments of the present disclosure.
Figure 3C:
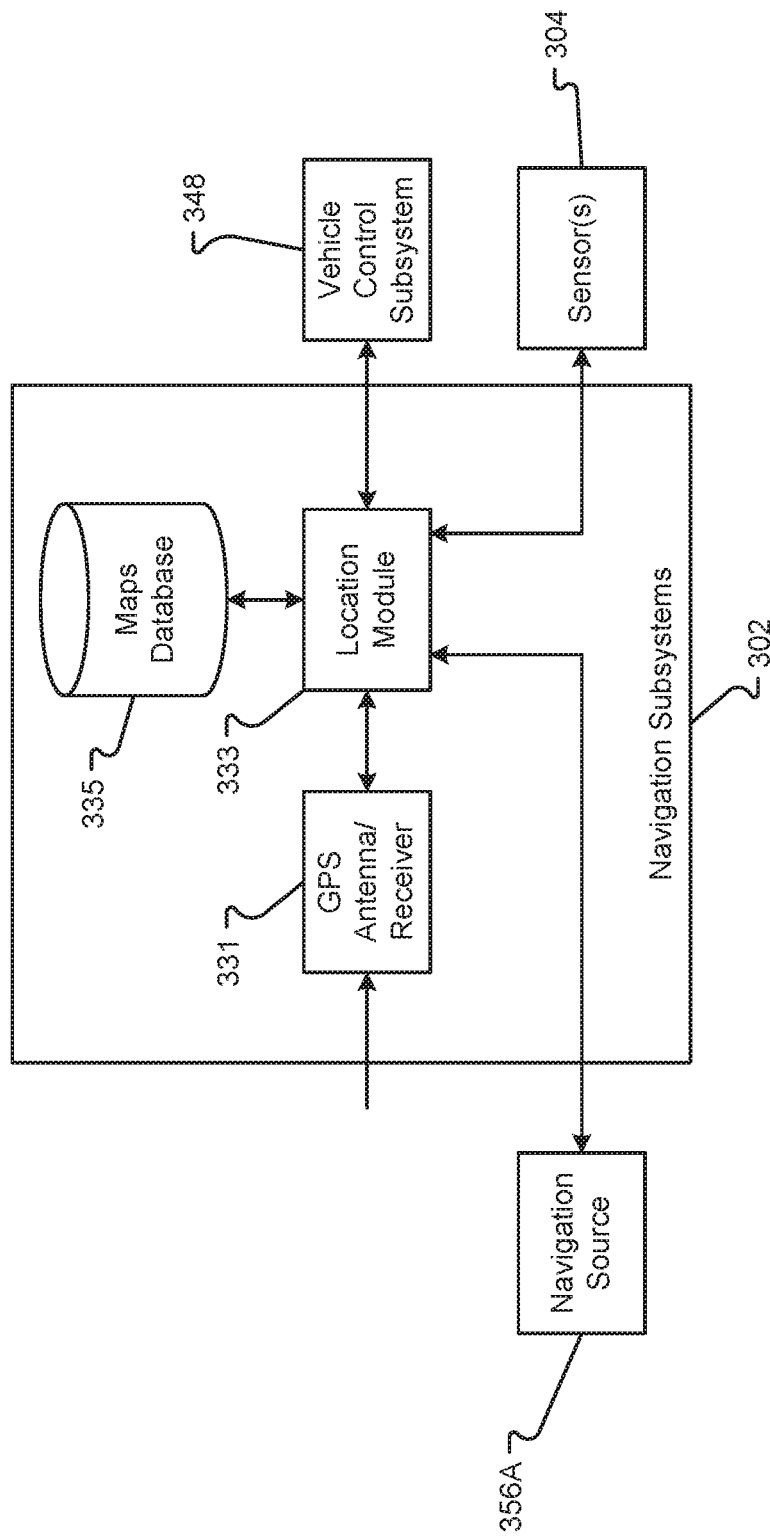
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally, or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random-access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally, or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally, or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long-range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
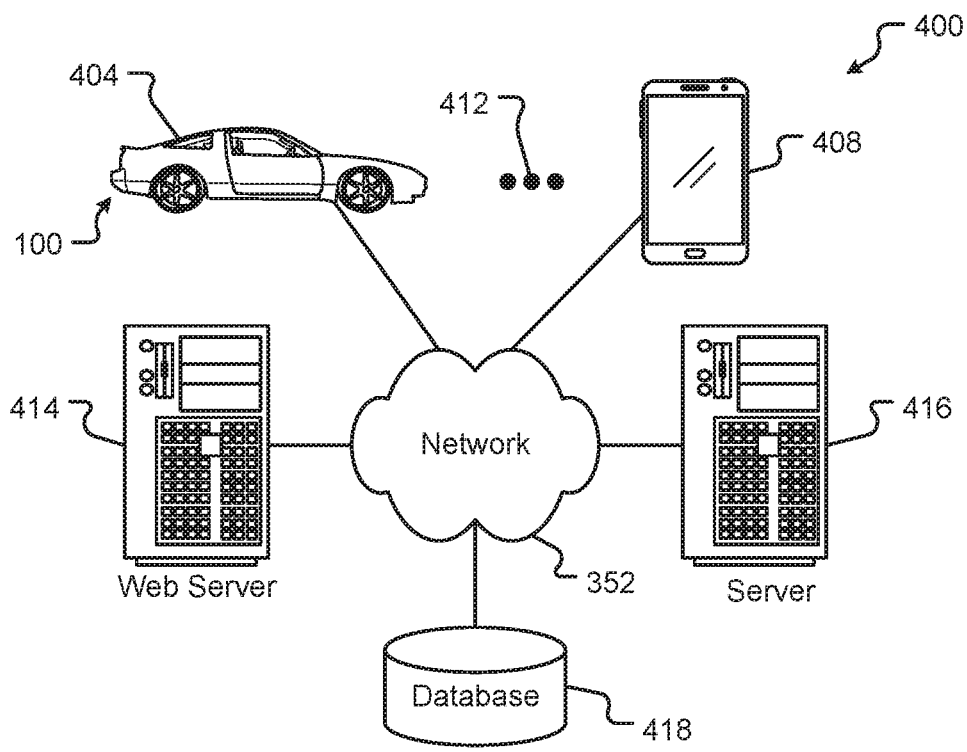
FIG. 4 is a block diagram of a computing environment associated with the embodiments presented herein.

FIG. 4 illustrates a block diagram of a computing environment 400 that may function as the servers, user computers, or other systems provided and described herein. The computing environment 400 includes one or more user computers, or computing devices, such as a vehicle computing device 404, a communication device 408, and/or more 412. The computing devices 404, 408, 412 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 404, 408, 412 may also have any of a variety of applications, including for example, database client and/or server applications, and web browser applications. Alternatively, the computing devices 404, 408, 412 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 400 is shown with two computing devices, any number of user computers or computing devices may be supported.

The computing environment 400 may also include one or more servers 414, 416. In this example, server 414 is shown as a web server and server 416 is shown as an application server. The web server 414, which may be used to process requests for web pages or other electronic documents from computing devices 404, 408, 412. The web server 414 can be running an operating system including any of those discussed above, as well as any commercially-available server operating systems. The web server 414 can also run a variety of server applications, including SIP (Session Initiation Protocol) servers, HTTP(s) servers, FTP servers, CGI servers, database servers, Java® servers, and the like. In some instances, the web server 414 may publish operations available operations as one or more web services.

The computing environment 400 may also include one or more file and or/application servers 416, which can, in addition to an operating system, include one or more applications accessible by a client running on one or more of the computing devices 404, 408, 412. The server(s) 416 and/or 414 may be one or more general purpose computers capable of executing programs or scripts in response to the computing devices 404, 408, 412. As one example, the server 416, 414 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 416 may also include database servers, including without limitation those commercially available from Oracle®, Microsoft®, Sybase®, IBM® and the like, which can process requests from database clients running on a computing device 404, 408, 412.

The web pages created by the server 414 and/or 416 may be forwarded to a computing device 404, 408, 412 via a web (file) server 414, 416. Similarly, the web server 414 may be able to receive web page requests, web services invocations, and/or input data from a computing device 404, 408, 412 (e.g., a user computer, etc.) and can forward the web page requests and/or input data to the web (application) server 416. In further embodiments, the server 416 may function as a file server. Although for ease of description, FIG. 4 illustrates a separate web server 414 and file/application server 416, those skilled in the art will recognize that the functions described with respect to servers 414, 416 may be performed by a single server and/or a plurality of specialized servers, depending on implementation-specific needs and parameters. The computer systems 404, 408, 412, web (file) server 414 and/or web (application) server 416 may function as the system, devices, or components described in FIGS. 1-4.

The computing environment 400 may also include a database 418. The database 418 may reside in a variety of locations. By way of example, database 418 may reside on a storage medium local to (and/or resident in) one or more of the computers 404, 408, 412, 414, 416. Alternatively, it may be remote from any or all of the computers 404, 408, 412, 414, 416, and in communication (e.g., via the network 352) with one or more of these. The database 418 may reside in a storage-area network ("SAN") familiar to those skilled in the art. Similarly, any necessary files for performing the functions attributed to the computers 404, 408, 412, 414, 416 may be stored locally on the respective computer and/or remotely, as appropriate. The database 418 may be a relational database, such as Oracle 20i®, that is adapted to store, update, and retrieve data in response to SQL-formatted commands.

Figure 5:
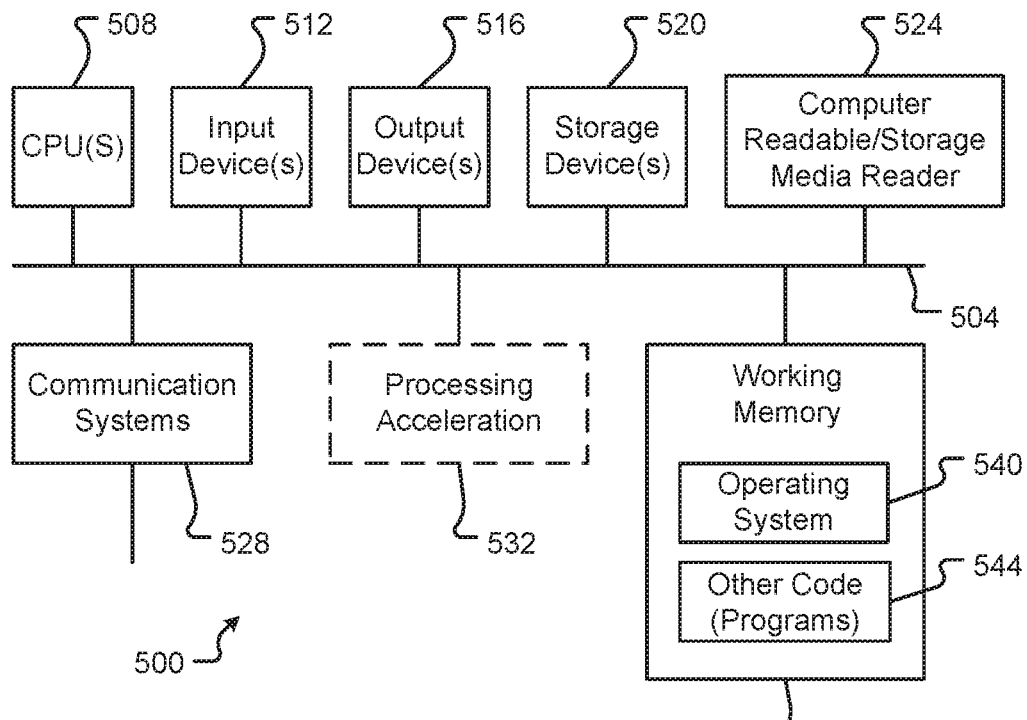
FIG. 5 is a block diagram of a computing device associated with one or more components described herein.

FIG. 5 illustrates one embodiment of a computer system 500 upon which the servers, user computers, computing devices, or other systems or components described above may be deployed or executed. The computer system 500 is shown comprising hardware elements that may be electrically coupled via a bus 504. The hardware elements may include one or more central processing units (CPUs) 508; one or more input devices 512 (e.g., a mouse, a keyboard, etc.); and one or more output devices 516 (e.g., a display device, a printer, etc.). The computer system 500 may also include one or more storage devices 520. By way of example, storage device(s) 520 may be disk drives, optical storage devices, solid-state storage devices such as a random-access memory ("RAM") and/or a read-only memory ("ROM"), which can be programmable, flash-updateable and/or the like.

The computer system 500 may additionally include a computer-readable storage media reader 524; a communications system 528 (e.g., a modem, a network card (wireless or wired), an infra-red communication device, etc.); and working memory 536, which may include RAM and ROM devices as described above. The computer system 500 may also include a processing acceleration unit 532, which can include a DSP, a special-purpose processor, and/or the like.

The computer-readable storage media reader 524 can further be connected to a computer-readable storage medium, together (and, optionally, in combination with storage device(s) 520) comprehensively representing remote, local, fixed, and/or removable storage devices plus storage media for temporarily and/or more permanently containing computer-readable information. The communications system 528 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 500 may also comprise software elements, shown as being currently located within a working memory 536, including an operating system 540 and/or other code 544. It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 508 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

As described above, a navigation system 302 of an autonomous machine such as a vehicle 100 can utilize different sensor inputs, e.g., LiDAR 320 and cameras 332. However, different sensors report information with respect to a local coordinate system. According to one embodiment, extrinsic sensor calibration can be performed to convert all sensors' data from the local coordinate of each to a global coordinate system so that the navigation system of the machine can have a reference coordinate system. For example, and according to one embodiment, extrinsic calibration of a LiDAR system and camera can be performed. It should be understood that the embodiments described herein are bi-directional, i.e., extrinsic calibration of the LiDAR system to the camera and/or the camera to the LiDAR system. Any discussion herein that describes or implies a unidirectional calibration of either the LiDAR system to the camera or the camera to the LiDAR system is offered by way of example only and should not be considered to limit the scope of the present disclosure.

Figure 6:
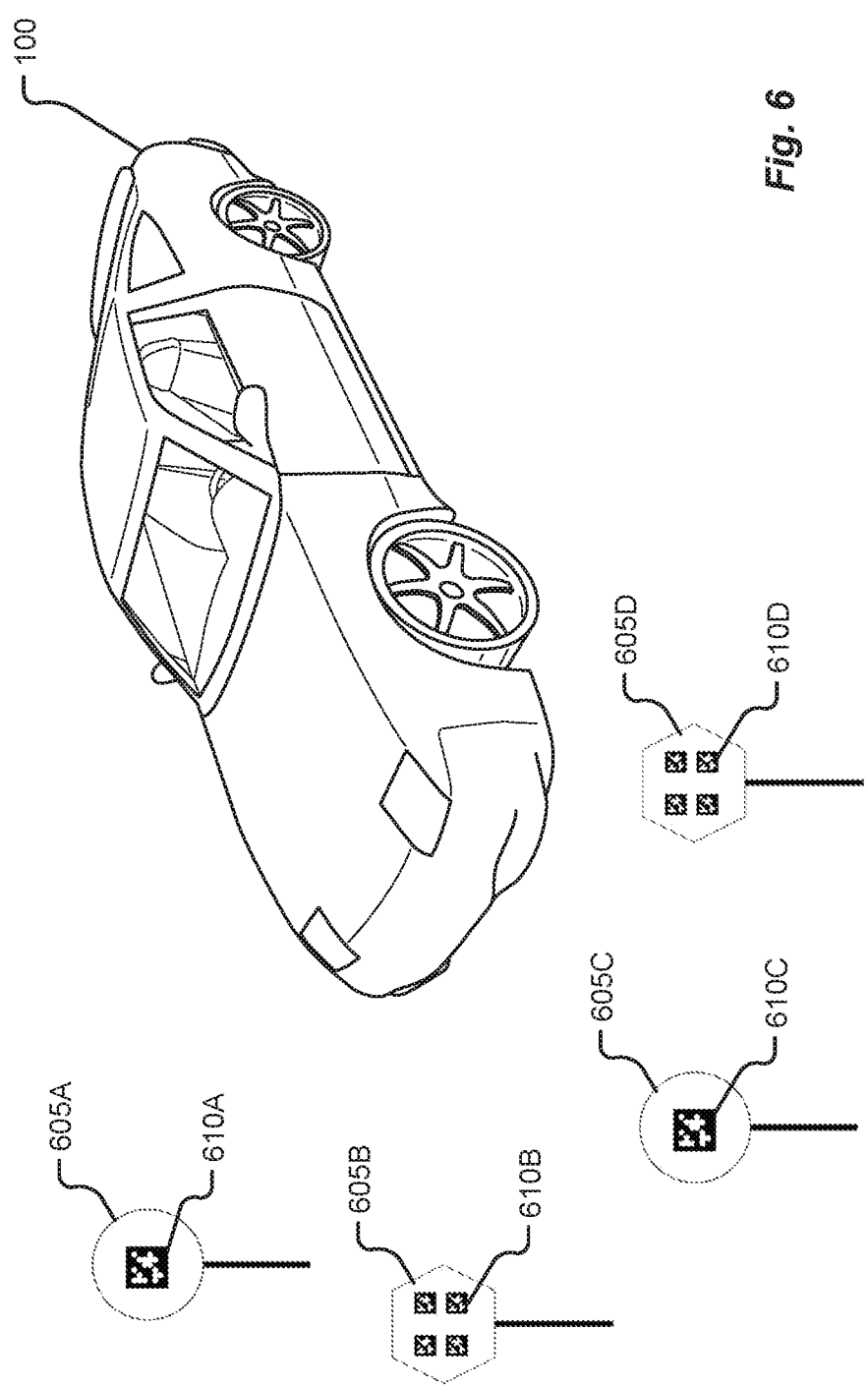
FIG. 6 illustrates a vehicle in a calibration environment as described herein.

FIG. 6 illustrates a vehicle in a calibration environment as described herein. As illustrated here, extrinsic sensor calibration can be performed on the navigation system 320 of a vehicle 100 or any other autonomous machine using a set of physical targets 605A-605D. Each physical target 605A-605D can have affixed thereto one or more visual markers 610A-610D such as Aruco markers, Aruco Boards, and/or Charuco Boards, for example.

In most existing LiDAR-camera extrinsic calibration methods, the physical targets 605A-605D are required to be place at a known location with respect to a global coordinate system used by the navigation system 302 and rely on GPS or a precise survey of the location. However, such setup and equipment are expensive and the necessary information is not easily obtained and maintain. Embodiments described herein remove the known location requirement by allowing targets to be placed randomly within the LiDAR and camera overlapping field of view. LiDAR also does not provide accurate intensity information which is needed by most existing LiDAR-camera extrinsic calibration methods. Embodiments of the present disclosure also remove the intensity information dependences on target detection/extraction. Embodiments described herein also improve the physical target detection uncertainty for camera by taking the median of multiple Aruco markers, Aruco boards, and/or Charuco boards of each calibration target. As a result, the estimation of target centers can be improved on camera frame of reference.

According to one embodiment, the physical targets 605A-605D can comprise any two-dimensional geometric shape, such as a circle, hexagon, triangle, pentagon, rectangle, etc., and/or any three-dimensional geometric shape, such as a cylinder, cube, sphere, etc., as targets for the LiDAR 320. Single or multiple markers, such as Aruco markers, Aruco boards, and/or Charuco boards, can be used as targets for the camera. To perform LiDAR-camera extrinsic calibration according to one embodiment, the physical targets 605A-605D are placed within the overlapping field of view of the camera 332 and LiDAR 320 sensors and single or multiple markers, such as Aruco markers, Aruco board, Charuco board, can be affixed to the center of each physical calibration target 605A-605D. The marker identifying the center of each target can be easily detected by the camera 332. Using the LiDAR point cloud detected by the LiDAR sensor, clustering and fitting of detection points can be performed and the targets in the point cloud can be segmented by detected geometric shape. Fitting of the centers of the targets can be performed using the segmented point cloud. Once the centers of the targets are computed in three dimensions with respected to the sensors' coordinate system, the centers can be associated by a correspondence matching algorithm. A six-degree-of-freedom transformation for the LiDAR and camera can be computed using Singular Value Decomposition (SVD) or other registration method by using the detected targets center from LiDAR and camera data. Since the calibration targets are simple symmetric 2D geometric shape, by using the characteristic of the geometric shape, target detection and fitting can be possible even if only half of the physical targets is visible to the LiDAR 320. Extrinsic calibration can then be performed. Additionally, this approach does not require the edge of the geometric shape to be visible to the LiDAR 320 nor edges has to be extracted accurately. Further still, this approach to extrinsic calibration can be performed without knowing the location of the calibration targets and the use of intensity information.

The LiDAR 320 can provide the three-dimensional location of surface of the calibration targets with respect to the coordinate system of the LiDAR 320. With proper camera 332 intrinsic calibration parameters, the Aruco marker, Aruco board, Charuco board can be used to provide the three-dimensional location of the center of the calibration targets with respect to the camera 332. Since the surface of the calibration target can be extracted from the point cloud and fitted using geometric equation, the center can be computed easily. Once the center of the calibration target is computed in both LiDAR frame and camera frame information, the three-dimensional to three-dimensional six-degree-of-freedom rigid body transformation can be computed by using singular value decomposition or various linear and nonlinear optimization methods. The calibration target's information such as radius and/or planar normal can be used to reconstruct the geometric shape for validation purposes. Since the geometric shape can be reconstructed using the fitted center of the geometric shape, the edge of the geometric shape does not have to be accurately extracted. Rather, points on the targets can be used.

Figure 7:
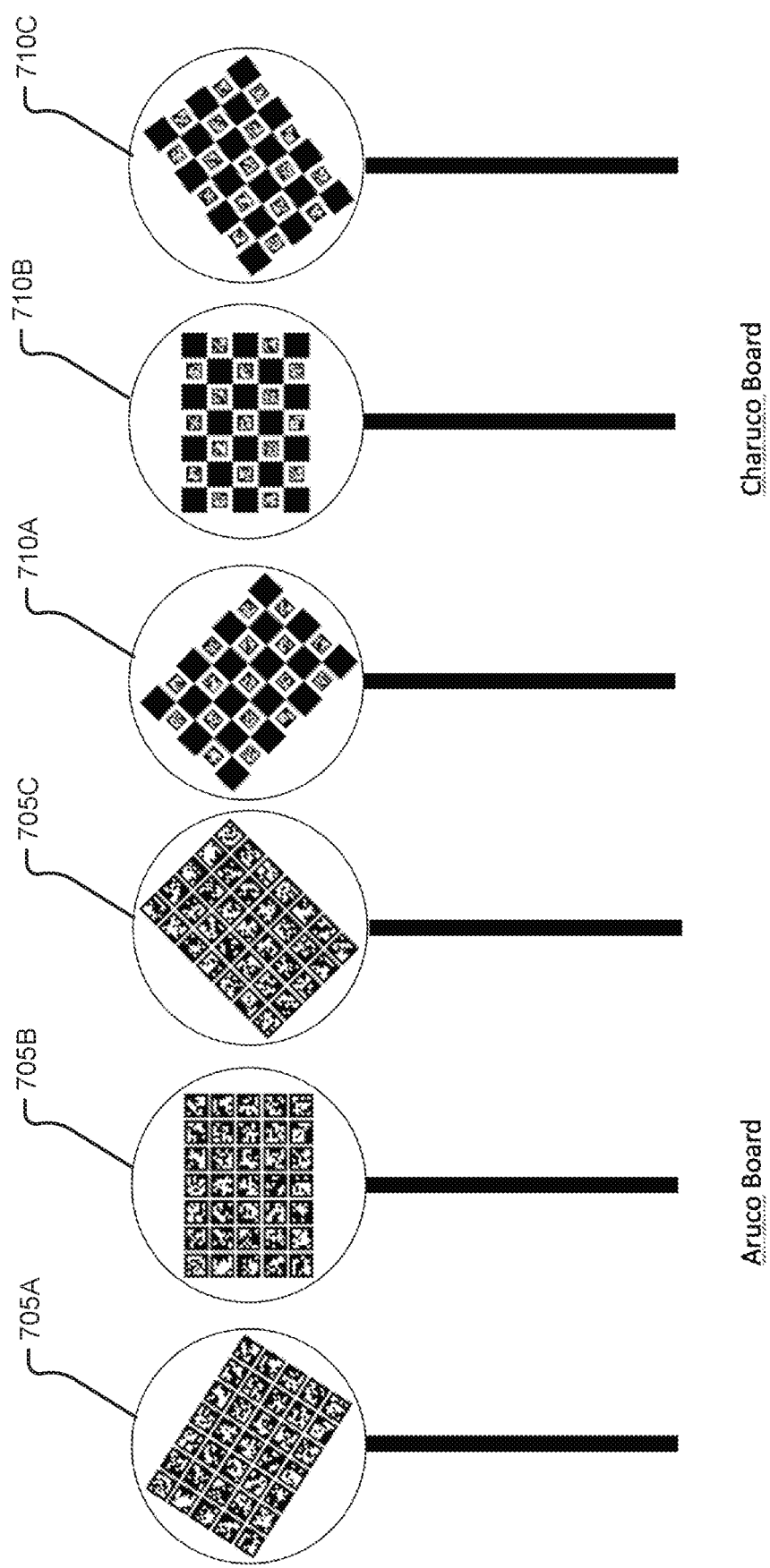
FIG. 7 illustrates additional examples of calibration targets which may be used with various embodiments of the present disclosure.

FIG. 7 illustrates additional examples of calibration targets which may be used with various embodiments of the present disclosure. More specifically, this example illustrates exemplary Aruco boards 705A-705C and exemplary Charuco boards 710A-710C which may be used as calibration targets as described herein. It should be noted that the geometric shape of each target 705A-705C and/or 710A-710C can vary as also described herein. That is, while the targets 705A-705C and 710A-710C are illustrated here as circular or spherical, various other geometric shapes as described herein can be utilized depending upon the exact implement and without departing from the scope of the present disclosure. Additionally, it should be understood that the position or location as well as the orientation of the boards on the targets 705A-705C and 710A-710C as shown here are exemplary and for illustrative purposes only. In various implementations, different locations and/or orientations may be used without departing from the scope of the present disclosure.

Figure 8:
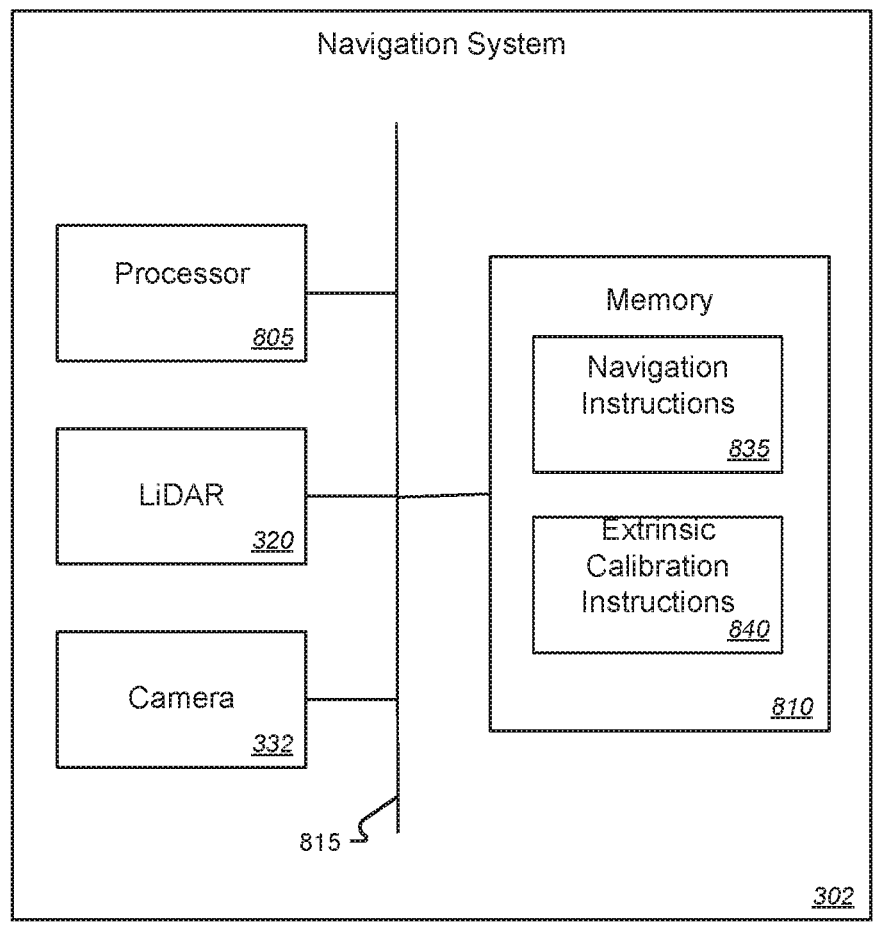
FIG. 8 is a block diagram illustrating additional details of an exemplary navigation system of a vehicle or other autonomous machine.

FIG. 8 is a block diagram illustrating additional details of an exemplary navigation system of a vehicle or other autonomous machine. As illustrated in this example, the navigation system 302 can comprise a processor 805. The processor 805 may correspond to one or many computer processing devices. For instance, the processor 805 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 805 may be provided as a microprocessor, Central Processing Unit (CPU), or plurality of microprocessors that are configured to execute the instructions sets stored in a memory 810. Upon executing the instruction sets stored in memory 810, the processor 805 can perform the extrinsic calibration functions as described herein. The processor 805 can also be coupled with the LiDAR sensors 320 and cameras 332 as described above.

The memory 810 can be coupled with and readable by the processor 805 via a communications bus 815. The memory 810 may include any type of computer memory device or collection of computer memory devices. Non-limiting examples of memory 810 include Random Access Memory (RAM), Read Only Memory (ROM), flash memory, Electronically-Erasable Programmable ROM (EEPROM), Dynamic RAM (DRAM), etc. The memory 810 may be configured to store the instruction sets depicted in addition to temporarily storing data for the processor 805 to execute various types of routines or functions.

The memory can store therein sets of instructions which, when executed by the processor 805, cause the processor 805 to navigate the vehicle 100 or other autonomous machine and also to perform the extrinsic calibration of the LiDAR sensors 320 and cameras 332 as described herein. For example, the memory 810 can store a set of navigation instructions 835 which, when executed by the processor 805, can cause the processor 805 to direct and navigate the vehicle in a fully autonomous, semi-autonomous or other mode as described above. The memory 810 can also have stored therein a set of extrinsic calibration instructions 840 which, when executed by the processor 805, causes the processor 805 to perform extrinsic calibration of one sensor, e.g., the LiDAR and another sensor, e.g., the cameras 332, by receiving an input from the LiDAR 320 and detecting one or more of the plurality of physical calibration targets based on the received input from the LiDAR 320. Receiving the input from the LiDAR 320 can comprise reading a LiDAR point cloud, and detecting the plurality of physical calibration targets based on the received input from the first sensor comprises performing LiDAR geometric detection. According to one embodiment, the extrinsic calibration instructions 840 can cause the processor 805 to perform LiDAR geometric detection by defining a geometric shape for each reconstructed calibration target of the first plurality of reconstructed calibration targets based on the LiDAR point cloud, segregating one or more vertical objects in the first plurality of reconstructed targets based on the defined geometric shapes, clustering the segregated one or more vertical objects, performing geometric filtering on the clustered vertical objects, and extracting geometric feature characteristics from the filtered clustered vertical objects.

The extrinsic calibration instructions 840, when executed by the processor 805, can also cause the processor 805 to receive an input from the camera 332 and detect one or more of the plurality of physical calibration targets based on the received input from the camera 332. Receiving the input from the camera 332 can comprise receiving an image frame from the camera 332 and detecting the plurality of physical calibration targets based on the received input from the camera 332 can comprise detecting one or more markers, such as Aruco markers, Aruco board, Charuco board, on each of the plurality of physical calibration targets. According to one embodiment, the extrinsic calibration instructions 840 can cause the processor 805 to detect the plurality of physical calibration targets by extracting one or more geometric feature characteristics of the each physical target based on the detecting of the one or more markers on each of the plurality of physical calibration targets.

The extrinsic calibration instructions 840, when executed by the processor 805, can also cause the processor 805 to construct a first set of reconstructed calibration targets in a three-dimensional space around the autonomous machine or vehicle 100 based on the one or more physical calibration targets detected from the input from the LiDAR 320 and a second set of reconstructed calibration targets in the three-dimensional space around the autonomous machine or vehicle 100 based on the one or more physical calibration targets detected based on the input from the cameras 332. The extrinsic calibration instructions 840 can then cause the processor 805 to match one or more reconstructed calibration targets in the first set of reconstructed calibration targets with one or more reconstructed calibration targets in the second set of reconstructed calibration targets, compute a six-degree of freedom rigid body transformation of the LiDAR and camera based on the matched one or more reconstructed calibration targets, and compute a projection of the first sensor to the second sensor based on the computed six-degree of freedom rigid body transformation of the LiDAR and camera based on the matched one or more reconstructed calibration targets.

Figure 9:
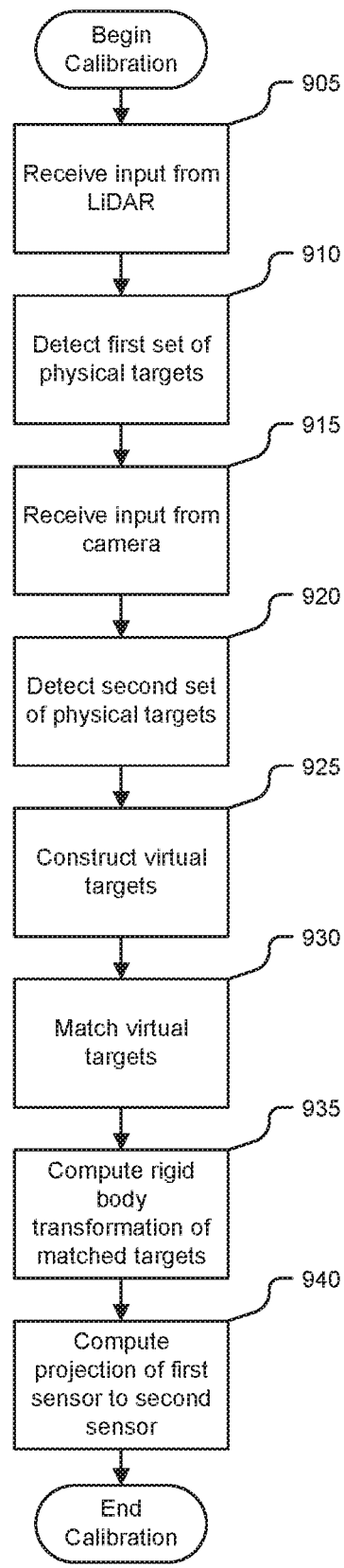
FIG. 9 is a flowchart illustrating an exemplary process for extrinsic calibration according to one embodiment of the present disclosure.

FIG. 9 is a flowchart illustrating an exemplary process for extrinsic calibration according to one embodiment of the present disclosure. As illustrated in this example, extrinsic calibration of a plurality of sensors of an autonomous machine, such as the vehicle 100 described above, a robot, or other machine, can comprise receiving 905, by a navigation system 302 of the autonomous machine, input from a first sensor of the plurality of sensors. The input from the first sensor 320 can provide a first representation of a plurality of physical calibration targets 605B and 605D in physical surroundings of the autonomous machine detectable by the first sensor 320. The plurality of physical calibration targets 605B and 605D can be detected 910 by the navigation system 302 of the autonomous machine based on the received input from the first sensor 320. For example, the first sensor 320 can comprise a LiDAR sensor. In such cases, receiving 905 the input from the first sensor 320 can comprise reading a LiDAR point cloud and wherein detecting 910 the plurality of physical calibration targets 605B and 605D based on the received input from the first sensor 320 can comprise performing LiDAR geometric detection as will be described below.

Input from a second sensor 332 of the plurality of sensors can be received 915 by the navigation system 302 of the autonomous machine. The input from the second sensor 332 can provide a second representation of a plurality of physical calibration targets 605A and 605C in the physical surroundings of the autonomous machine detectable by the second sensor 332. The plurality of physical calibration targets 605A and 605C can be detected 920 by the navigation system of the autonomous machine based on the received 915 input from the second sensor 332. For example, the second sensor 332 can comprise a camera and receiving 915 the input from the second sensor 332 can comprise receiving an image frame from the camera. In such cases, detecting 920 the plurality of physical calibration targets 605A and 605C based on the received input from the second sensor 332 can comprise detecting one or more markers 610A-610D on each of the plurality of physical calibration targets 605A-605D and extracting one or more geometric feature characteristics of the each physical target based on the detecting of the one or more markers on each of the plurality of physical calibration targets as will be described below.

A first plurality of reconstructed calibration targets and a second plurality of reconstructed calibration targets can be constructed 925 by the navigation system 302 in a three-dimensional space around the autonomous machine of the autonomous machine based on the plurality of physical calibration targets 605A-605D detected 910 and 920. One or more reconstructed calibration targets in the first plurality of reconstructed calibration targets can be matched 930 by the navigation system 302 of the autonomous machine with one or more reconstructed calibration targets in the second plurality of reconstructed calibration targets, e.g., based on proximity in the three-dimensional space and/or the extracted features of the physical targets. A six-degree of freedom rigid body transformation of the LiDAR and camera based on the matched one or more reconstructed calibration targets can then be computed 935 by the navigation system 302 of the autonomous machine and a projection of the first sensor to the second sensor can be computed 940 based on the six-degree of freedom rigid body transformation of the LiDAR and camera based on the matched one or more reconstructed calibration targets.

As noted above, it should be understood that the embodiments described herein are bi-directional, i.e., extrinsic calibration of the LiDAR system to the camera and/or the camera to the LiDAR system. The discussion provided here with reference to FIG. 9 is provided by way of example rather than limitation and should not be considered to imply a unidirectional calibration of either the LiDAR system to the camera or the camera to the LiDAR system. Rather, the "first sensor" as described above can also be the camera while the "second sensor" can be the LiDAR. Additionally, it should be understood that the order and/or sequence of steps can be varied without departing from the scope of the present disclosure. For example, various steps can be performed in parallel rather than in serial as will be described below.

Figure 10:
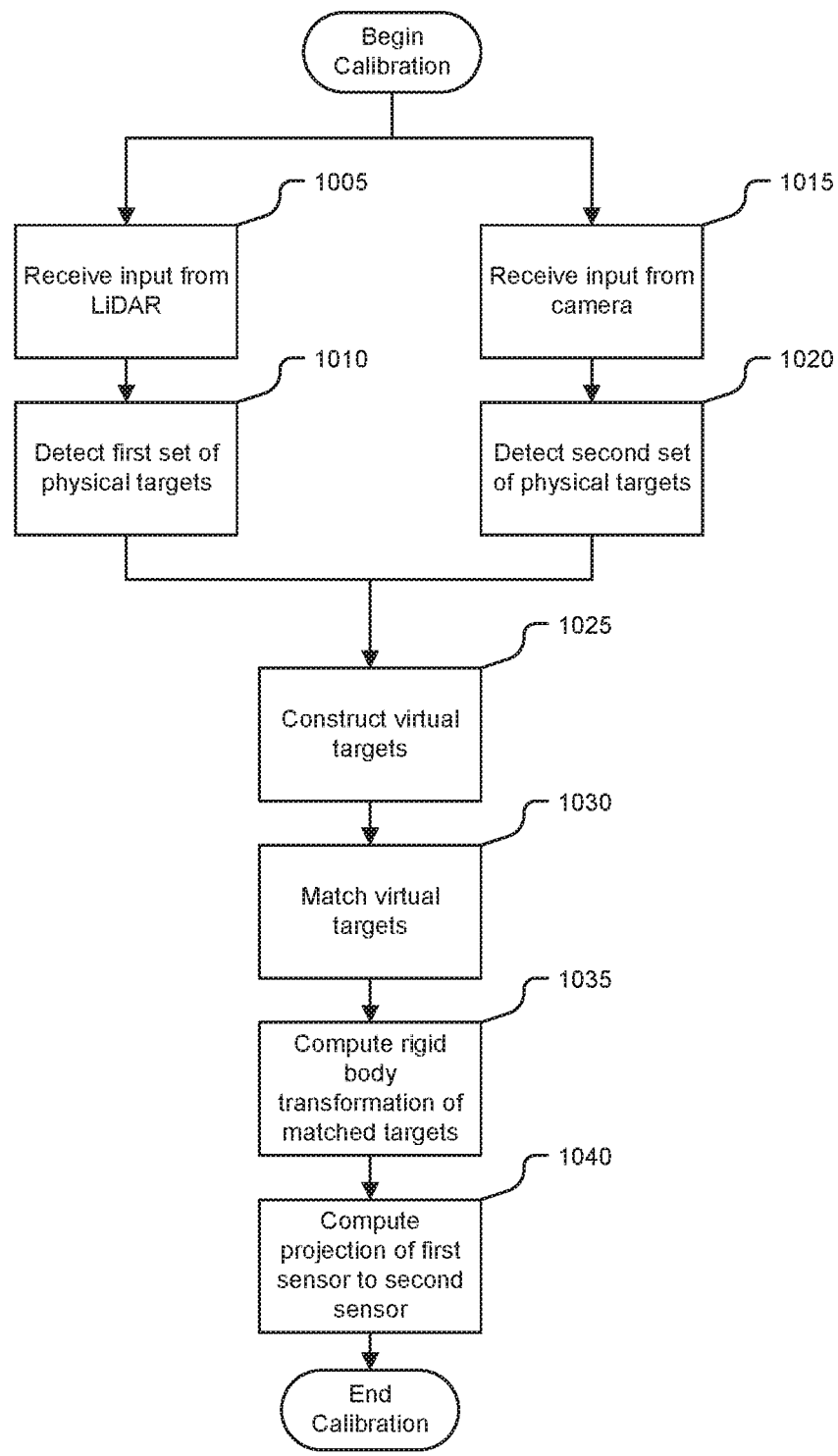
FIG. 10 is a flowchart illustrating another exemplary process for extrinsic calibration according to one embodiment of the present disclosure.

FIG. 10 is a flowchart illustrating an exemplary process for extrinsic calibration according to another embodiment of the present disclosure. As illustrated in this example, extrinsic LiDAR-camera calibration can comprise receiving 1005, by a navigation system 302 of the autonomous machine, input from a LiDAR system 320. The input from the LiDAR system 320 can provide a first representation of a plurality of physical calibration targets 605B and 605D in physical surroundings of the autonomous machine detectable by the LiDAR 320. The plurality of physical calibration targets 605B and 605D can be detected 1010 by the navigation system 302 of the autonomous machine based on the received input from the LiDAR system 320. For example, receiving 1005 the input from the LiDAR system 320 can comprise reading a LiDAR point cloud and wherein detecting 1010 the plurality of physical calibration targets 605B and 605D based on the received input from the LiDAR system 320 can comprise performing LiDAR geometric detection as will be described below.

In parallel with receiving 1005 input from the LiDAR system 320 and detecting 1010 the physical calibration targets 605B and 605D from the received LiDAR point cloud, input from a camera 332 can be received 1015 by the navigation system 302 of the autonomous machine. The input from the camera 332 can provide a second representation of a plurality of physical calibration targets 605A and 605C in the physical surroundings of the autonomous machine detectable by the camera 332. The plurality of physical calibration targets 605A and 605C can be detected 1020 by the navigation system of the autonomous machine based on the received 1015 input from the camera 332. For example, receiving 1015 the input from the camera 332 can comprise receiving an image frame. In such cases, detecting 1020 the plurality of physical calibration targets 605A and 605C based on the received input from the camera 332 can comprise detecting one or more markers 610A-610D on each of the plurality of physical calibration targets 605A-605D and extracting one or more geometric feature characteristics of the each physical target based on the detecting of the one or more markers on each of the plurality of physical calibration targets as will be described below.

A first plurality of reconstructed calibration targets and a second plurality of reconstructed calibration targets can be constructed 1025 by the navigation system 302 in a three-dimensional space around the autonomous machine of the autonomous machine based on the plurality of physical calibration targets 605A-605D detected 1010 and 1020. One or more reconstructed calibration targets in the first plurality of reconstructed calibration targets can be matched 1030 by the navigation system 302 of the autonomous machine with one or more reconstructed calibration targets in the second plurality of reconstructed calibration targets, e.g., based on proximity in the three-dimensional space and/or the extracted features of the physical targets. A six-degree of freedom rigid body transformation of the LiDAR and camera based on the matched one or more reconstructed calibration targets can then be computed 1035 by the navigation system 302 of the autonomous machine and a projection of the LiDAR to the camera can be computed 1040 based on the six-degree of freedom rigid body transformation of the LiDAR and camera based on the matched one or more reconstructed calibration targets.

Figure 11:
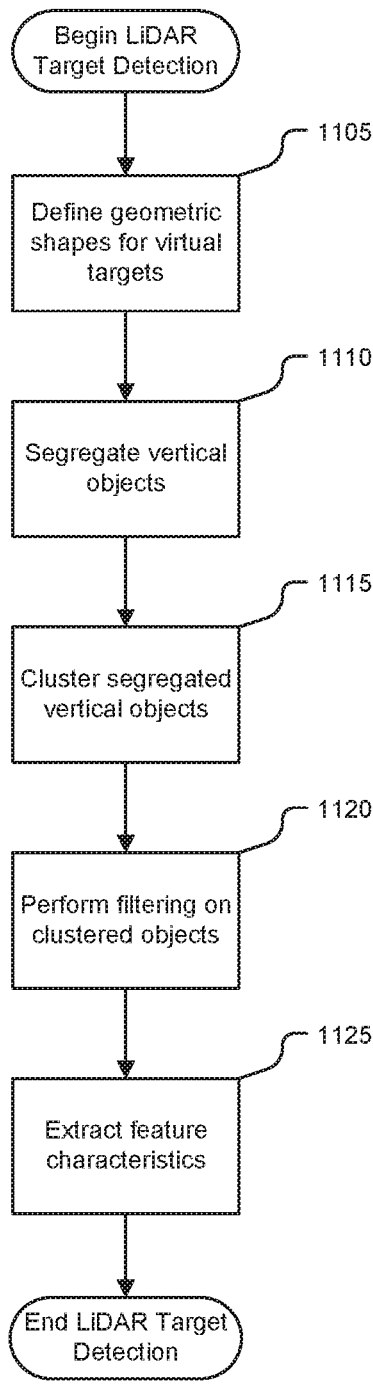
FIG. 11 is a flowchart illustrating an exemplary process for geometric detection according to one embodiment of the present disclosure.

FIG. 11 is a flowchart illustrating an exemplary process for geometric detection according to one embodiment of the present disclosure. As noted above, one of the sensors can comprise a LiDAR sensor and receiving the input from this sensor can comprise reading a LiDAR point cloud and the plurality of physical calibration targets can be detected by performing LiDAR geometric detection. As illustrated in this example, performing LiDAR geometric detection can comprise defining 1105 a geometric shape for each reconstructed calibration target of the first plurality of reconstructed calibration targets based on the LiDAR point cloud. One or more vertical objects in the first plurality of reconstructed targets can be segregated 1110 based on the defined geometric shapes and the segregated one or more vertical objects can be clustered 1115. Geometric filtering can be performed on the clustered vertical objects and geometric feature characteristics can be extracted 1125 from the filtered clustered vertical objects.

Figure 12:
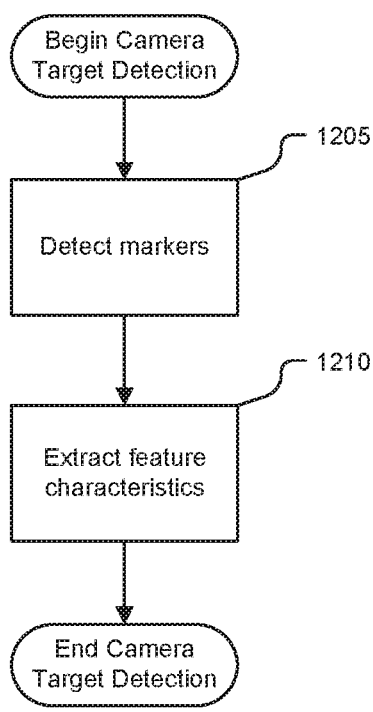
FIG. 12 is a flowchart illustrating an exemplary process for target detection according to one embodiment of the present disclosure.

FIG. 12 is a flowchart illustrating an exemplary process for target detection according to one embodiment of the present disclosure. Also as noted above, the other sensor can comprise a camera and receiving the input from this sensor can comprise receiving an image frame from the camera. Detecting the plurality of physical calibration targets based on this input can comprise detecting 1205 one or more markers, such as Aruco markers, Aruco board, Charuco board, on each of the plurality of physical calibration targets. One or more geometric feature characteristics of each physical target can then be extracted 1210 based on the detecting of the one or more markers on each of the plurality of physical calibration targets.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for extrinsic calibration of a plurality of sensors of an autonomous machine, the plurality of sensors comprising a Light Detection And Ranging (LiDAR) sensor and a camera, the method comprising: receiving, by a navigation system of the autonomous machine, input from a first sensor of the plurality of sensors, the input from the first sensor providing a first representation of a plurality of physical calibration targets in physical surroundings of the autonomous machine detectable by the first sensor; detecting, by the navigation system of the autonomous machine, the plurality of physical calibration targets based on the received input from the first sensor; receiving, by the navigation system of the autonomous machine, input from a second sensor of the plurality of sensors, the input from the second sensor providing a second representation of a plurality of physical calibration targets in the physical surroundings of the autonomous machine detectable by the second sensor; detecting, by the navigation system of the autonomous machine, the plurality of physical calibration targets based on the received input from the second sensor; constructing, by the navigation system of the autonomous machine, a first plurality of reconstructed calibration targets in a three-dimensional space around the autonomous machine based on the plurality of physical calibration targets detected based on the input from the first sensor and a second plurality of reconstructed calibration targets in the three-dimensional space around the autonomous machine based on the plurality of physical calibration targets detected based on the input from the second sensor; matching, by the navigation system of the autonomous machine, one or more reconstructed calibration targets in the first plurality of reconstructed calibration targets with one or more reconstructed calibration targets in the second plurality of reconstructed calibration targets; computing, by the navigation system of the autonomous machine, a six-degree of freedom rigid body transformation of the first sensor and second sensor based on the matched one or more reconstructed calibration targets; and computing, by the navigation system of the autonomous machine, a projection of the first sensor to the second sensor based on the computed six-degree of freedom rigid body transformation of the first sensor and second sensor based on the matched one or more reconstructed calibration targets.

Aspects of the above method include wherein receiving the input from the LiDAR sensor comprises reading a LiDAR point cloud, and wherein detecting the plurality of physical calibration targets based on the received input from the LiDAR sensor comprises performing LiDAR geometric detection.

Aspects of the above method include wherein performing LiDAR geometric detection comprises: defining a geometric shape for each reconstructed calibration target of the first plurality of reconstructed calibration targets based on the LiDAR point cloud; segregating one or more vertical objects in the first plurality of reconstructed targets based on the defined geometric shapes; clustering the segregated one or more vertical objects; performing geometric filtering on the clustered vertical objects; and extracting geometric feature characteristics from the filtered clustered vertical objects.

Aspects of the above method include wherein the physical calibration targets comprise three-dimensional geometric shapes placed at random locations in the physical surroundings of the autonomous machine.

Aspects of the above method include wherein receiving the input from the camera comprises receiving an image frame from the camera, and wherein detecting the plurality of physical calibration targets based on the received input from the camera comprises detecting one or more markers on each of the plurality of physical calibration targets.

Aspects of the above method include wherein detecting the plurality of physical calibration targets detectable by the camera based on the received input from the camera further comprises extracting one or more geometric feature characteristics of the each physical target based on the detecting of the one or more markers on each of the plurality of physical calibration targets.

Aspects of the above method include wherein the physical calibration targets comprise two-dimensional geometric shapes placed at random locations in the physical surroundings of the autonomous machine and the one or more markers comprise one or more of Aruco markers, Aruco boards, or Charuco boards.

Embodiments include a navigation system of an autonomous machine, the navigation system comprising: a first sensor providing a first representation of a plurality of physical calibration targets in a physical surroundings of the autonomous machine; a second sensor providing a second representation of the plurality of physical calibration targets in the physical surroundings of the autonomous machine; a processor coupled with the first sensor and the second sensor; and a memory coupled with and readable by the first processor and storing therein a set of instructions which, when executed by the processor, causes the processor to perform extrinsic calibration of the first sensor and second sensor by: receiving an input from the first sensor, detecting one or more of the plurality of physical calibration targets based on the received input from the first sensor, receiving an input from the second sensor, detecting one or more of the plurality of physical calibration targets based on the received input from the second sensor, constructing a first set of reconstructed calibration targets in a three-dimensional space around the autonomous machine based on the one or more physical calibration targets detected based on the input from the first sensor and a second set of reconstructed calibration targets in the three-dimensional space around the autonomous machine based on the one or more physical calibration targets detected based on the input from the second sensor, matching one or more reconstructed calibration targets in the first set of reconstructed calibration targets with one or more reconstructed calibration targets in the second reconstructed of reconstructed calibration targets, computing a six-degree of freedom rigid body transformation of the first sensor and second sensor based on the matched one or more reconstructed calibration targets, and computing a projection of the first sensor to the second sensor based on the computed six-degree of freedom rigid body transformation of the first sensor and second sensor based on the matched one or more reconstructed calibration targets.

Aspects of the above navigation system include wherein the first sensor comprises a Light Detection And Ranging (LiDAR) sensor, wherein receiving the input from the first sensor comprises reading a LiDAR point cloud, and wherein detecting the plurality of physical calibration targets based on the received input from the first sensor comprises performing LiDAR geometric detection.

Aspects of the above navigation system include wherein performing LiDAR geometric detection comprises: defining a geometric shape for each reconstructed calibration target of the first plurality of reconstructed calibration targets based on the LiDAR point cloud; segregating one or more vertical objects in the first plurality of reconstructed targets based on the defined geometric shapes; clustering the segregated one or more vertical objects; performing geometric filtering on the clustered vertical objects; and extracting geometric feature characteristics from the filtered clustered vertical objects.

Aspects of the above navigation system include wherein the physical calibration targets comprise three-dimensional geometric shapes placed at random locations in the physical surroundings of the autonomous machine.

Aspects of the above navigation system include wherein the second sensor comprises a camera, wherein receiving the input from the second sensor comprises receiving an image frame from the camera, and wherein detecting the plurality of physical calibration targets based on the received input from the second sensor comprises detecting one or more markers on each of the plurality of physical calibration targets.

Aspects of the above navigation system include wherein detecting the plurality of physical calibration targets detectable by the second sensor based on the received input from the second sensor further comprises extracting one or more geometric feature characteristics of the each physical target based on the detecting of the one or more markers on each of the plurality of physical calibration targets.

Aspects of the above navigation system include wherein the physical calibration targets comprise two-dimensional geometric shapes placed at random locations in the physical surroundings of the autonomous machine and the one or more markers comprise one or more Aruco markers, Aruco boards, or Charuco boards.

Embodiments include a vehicle comprising: a first sensor providing a first representation of a physical surroundings of the vehicle; a second sensor providing a second representation of the physical surroundings of the vehicle; a navigation system coupled with the first sensor and the second sensor and comprising a memory and a processor coupled with and readable by the processor and having stored therein a set of instructions which, when executed by the processor, causes the processor to perform extrinsic calibration of the first sensor and second sensor by: receiving an input from the first sensor, detecting one or more of a plurality of physical calibration targets in the physical surroundings of the vehicle based on the received input from the first sensor, receiving an input from the second sensor, detecting one or more of the plurality of physical calibration targets based on the received input from the second sensor, constructing a first set of reconstructed calibration targets in a three-dimensional space around the vehicle based on the one or more physical calibration targets detected based on the input from the first sensor and a second set of reconstructed calibration targets in the three-dimensional space around the vehicle based on the one or more physical calibration targets detected based on the input from the second sensor, matching one or more reconstructed calibration targets in the first set of reconstructed calibration targets with one or more reconstructed calibration targets in the second set of reconstructed calibration targets, computing, a six-degree of freedom rigid body transformation of the first sensor and second sensor based on the matched one or more reconstructed calibration targets, and computing, a projection of the first sensor to the second sensor based on the computed six-degree of freedom rigid body transformation of the first sensor and second sensor based on the matched one or more reconstructed calibration targets.

Aspects of the above vehicle include wherein the first sensor comprises a Light Detection And Ranging (LiDAR) sensor, wherein receiving the input from the first sensor comprises reading a LiDAR point cloud, and wherein detecting the plurality of physical calibration targets based on the received input from the first sensor comprises performing LiDAR geometric detection.

Aspects of the above vehicle include wherein performing LiDAR geometric detection comprises: defining a geometric shape for each reconstructed calibration target of the first plurality of reconstructed calibration targets based on the LiDAR point cloud; segregating one or more vertical objects in the first plurality of reconstructed targets based on the defined geometric shapes; clustering the segregated one or more vertical objects; performing geometric filtering on the clustered vertical objects; and extracting geometric feature characteristics from the filtered clustered vertical objects.

Aspects of the above vehicle include wherein the physical calibration targets comprise three-dimensional geometric shapes placed at random locations in the physical surroundings of the autonomous machine.

Aspects of the above vehicle include wherein the second sensor comprises a camera, wherein receiving the input from the second sensor comprises receiving an image frame from the camera, and wherein detecting the plurality of physical calibration targets based on the received input from the second sensor comprises detecting one or more markers on each of the plurality of physical calibration targets.

Aspects of the above vehicle include wherein the physical calibration targets comprise two-dimensional geometric shapes placed at random locations in the physical surroundings of the autonomous machine and the one or more markers comprise one or more Aruco markers, Aruco boards, or Charuco board and wherein detecting the plurality of physical calibration targets detectable by the second sensor based on the received input from the second sensor further comprises extracting one or more geometric feature characteristics of the each physical target based on the detecting of the one or more Aruco markers, Aruco boards, or Charuco boards on each of the plurality of physical calibration targets.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for extrinsic calibration of a plurality of sensors of an autonomous machine, the plurality of sensors comprising a Light Detection And Ranging (LiDAR) sensor and a camera, the method comprising:
  receiving, by a navigation system of the autonomous machine, input from a first sensor of the plurality of sensors, the input from the first sensor providing a first representation of a plurality of physical calibration targets in physical surroundings of the autonomous machine detectable by the first sensor;
  detecting, by the navigation system of the autonomous machine, the plurality of physical calibration targets in a coordinate system of the first sensor based on the received input from the first sensor;
  receiving, by the navigation system of the autonomous machine, input from a second sensor of the plurality of sensors, the input from the second sensor providing a second representation of a plurality of physical calibration targets in the physical surroundings of the autonomous machine detectable by the second sensor;
  detecting, by the navigation system of the autonomous machine, the plurality of physical calibration targets in a coordinate system of the second sensor based on the received input from the second sensor;
  constructing, by the navigation system of the autonomous machine, a first plurality of reconstructed calibration targets in a three-dimensional space around the autonomous machine using a coordinate system of the navigation system of the autonomous machine based on the plurality of physical calibration targets detected in the coordinate system of the first sensor based on the input from the first sensor and a second plurality of reconstructed calibration targets in the three-dimensional space around the autonomous machine using the coordinate system of the navigation system of the autonomous machine based on the plurality of physical calibration targets detected in the coordinate system of the second sensor based on the input from the second sensor;
  matching, by the navigation system of the autonomous machine, one or more reconstructed calibration targets in the first plurality of reconstructed calibration targets in the coordinate system of the navigation system of the autonomous machine with one or more reconstructed calibration targets in the second plurality of reconstructed calibration targets in the coordinate system of the navigation system of the autonomous machine;
  computing, by the navigation system of the autonomous machine, a six-degree of freedom rigid body transformation of the first sensor and second sensor in the coordinate system of the navigation system of the autonomous machine based on the matched one or more reconstructed calibration targets; and
  computing, by the navigation system of the autonomous machine, a projection of the first sensor to the second sensor in the coordinate system of the navigation system of the autonomous machine based on the computed six-degree of freedom rigid body transformation of the first sensor and second sensor based on the matched one or more reconstructed calibration targets.

2. The method of claim 1, wherein receiving the input from a LiDAR sensor of the plurality of sensors comprises reading a LiDAR point cloud, and wherein detecting the plurality of physical calibration targets based on the received input from the LiDAR sensor comprises performing LiDAR geometric detection.

3. The method of claim 2, wherein performing LiDAR geometric detection comprises:
  defining a geometric shape for each reconstructed calibration target of the first plurality of reconstructed calibration targets based on the LiDAR point cloud;
  segregating one or more vertical objects in the first plurality of reconstructed calibration targets based on the defined geometric shapes of the first plurality of reconstructed calibration targets;
  clustering the segregated one or more vertical objects;
  performing geometric filtering on the clustered segregated one or more vertical objects; and
  extracting geometric feature characteristics from the geometric filtered clustered segregated one or more vertical objects.

4. The method of claim 3, wherein the physical calibration targets comprise three-dimensional geometric shapes placed at random locations in the physical surroundings of the autonomous machine.

5. The method of claim 2, wherein receiving the input from a camera of the plurality of sensors comprises receiving an image frame from the camera, and wherein detecting the plurality of physical calibration targets based on the received input from the camera comprises detecting one or more markers on each of the plurality of physical calibration targets.

6. The method of claim 5, wherein detecting the plurality of physical calibration targets detectable by the camera based on the received input from the camera further comprises extracting one or more geometric feature characteristics of the each of the plurality of physical targets based on the detecting of the one or more markers on each of the plurality of physical calibration targets.

7. The method of claim 6, wherein the physical calibration targets comprise two-dimensional geometric shapes placed at random locations in the physical surroundings of the autonomous machine and the one or more markers comprise one or more of Aruco markers, Aruco boards, or Charuco boards.

8. A navigation system of an autonomous machine, the navigation system comprising:
  a first sensor providing a first representation of a plurality of physical calibration targets in a physical surroundings of the autonomous machine;
  a second sensor providing a second representation of the plurality of physical calibration targets in the physical surroundings of the autonomous machine;
  a processor coupled with the first sensor and the second sensor; and
  a memory coupled with and readable by a processor and storing therein a set of instructions which, when executed by the processor, causes the processor to perform extrinsic calibration of the first sensor and second sensor by:
    receiving an input from the first sensor,
    detecting one or more of the plurality of physical calibration targets in a coordinate system of the first sensor based on the received input from the first sensor,
    receiving an input from the second sensor, detecting one or more of the plurality of physical calibration targets in a coordinate system of the second sensor based on the received input from the second sensor, constructing a first set of reconstructed calibration targets in a three-dimensional space around the autonomous machine using a coordinate system of the navigation system of the autonomous machine based on the plurality of physical calibration targets detected in the coordinate system of the first sensor based on the input from the first sensor and a second set of reconstructed calibration targets in the three-dimensional space around the autonomous machine using the coordinate system of the navigation system of the autonomous machine based on the plurality of physical calibration targets detected in the coordinate system of the second sensor based on the input from the second sensor, matching one or more reconstructed calibration targets in the first set of reconstructed calibration targets in the coordinate system of the navigation system of the autonomous machine with one or more reconstructed calibration targets in the second reconstructed of reconstructed calibration targets in the coordinate system of the navigation system of the autonomous machine, computing a six-degree of freedom rigid body transformation of the first sensor and second sensor in the coordinate system of the navigation system of the autonomous machine based on the matched one or more reconstructed calibration targets, and computing a projection of the first sensor to the second sensor in the coordinate system of the navigation system of the autonomous machine based on the computed six-degree of freedom rigid body transformation of the first sensor and second sensor based on the matched one or more reconstructed calibration targets.

9. The navigation system of claim 8, wherein the first sensor comprises a Light Detection And Ranging (LiDAR) sensor, wherein receiving the input from the first sensor comprises reading a LiDAR point cloud, and wherein detecting the plurality of physical calibration targets based on the received input from the first sensor comprises performing LiDAR geometric detection.

10. The navigation system of claim 9, wherein performing LiDAR geometric detection comprises:
defining a geometric shape for each reconstructed calibration target of a first plurality of reconstructed calibration targets based on the LiDAR point cloud;
segregating one or more vertical objects in the first plurality of reconstructed calibration targets based on the defined geometric shapes of the first plurality of reconstructed calibration targets;
clustering the segregated one or more vertical objects;
performing geometric filtering on the clustered segregated one or more vertical objects; and
extracting geometric feature characteristics from the geometric filtered clustered segregated one or more vertical objects.

11. The navigation system of claim 10, wherein the physical calibration targets comprise three-dimensional geometric shapes placed at random locations in the physical surroundings of the autonomous machine.

12. The navigation system of claim 9, wherein the second sensor comprises a camera, wherein receiving the input from the second sensor comprises receiving an image frame from the camera, and wherein detecting the plurality of physical calibration targets based on the received input from the second sensor comprises detecting one or more markers on each of the plurality of physical calibration targets.

13. The navigation system of claim 12, wherein detecting the plurality of physical calibration targets detectable by the second sensor based on the received input from the second sensor further comprises extracting one or more geometric feature characteristics of the each of the plurality of physical targets based on the detecting of the one or more markers on each of the plurality of physical calibration targets.

14. The navigation system of claim 13, wherein the physical calibration targets comprise two-dimensional geometric shapes placed at random locations in the physical surroundings of the autonomous machine and the one or more markers comprise one or more Aruco markers, Aruco boards, or Charuco boards.

15. A vehicle comprising:
a first sensor providing a first representation of a physical surroundings of the vehicle;
a second sensor providing a second representation of the physical surroundings of the vehicle;
a navigation system coupled with the first sensor and the second sensor and comprising a memory and a processor coupled with and readable by the processor and having stored therein a set of instructions which, when executed by the processor, causes the processor to perform extrinsic calibration of the first sensor and second sensor by:
receiving an input from the first sensor,
detecting one or more of a plurality of physical calibration targets in the physical surroundings of the vehicle in a coordinate system of the first sensor based on the received input from the first sensor,
receiving an input from the second sensor,
detecting one or more of the plurality of physical calibration targets in a coordinate system of the second sensor based on the received input from the second sensor,
constructing a first set of reconstructed calibration targets in a three-dimensional space around the vehicle using a coordinate system of the navigation system based on the plurality of physical calibration targets detected in the coordinate system of the first sensor based on the input from the first sensor and a second set of reconstructed calibration targets in the three-dimensional space around the vehicle using the coordinate system of the navigation system based on the plurality of physical calibration targets detected in the coordinate system of the second sensor based on the input from the second sensor,
matching one or more reconstructed calibration targets in the first set of reconstructed calibration targets using the coordinate system of the navigation system with one or more reconstructed calibration targets in the second set of reconstructed calibration targets using the coordinate system of the navigation system,
computing a six-degree of freedom rigid body transformation of the first sensor and second sensor using the coordinate system of the navigation system based on the matched one or more reconstructed calibration targets, and
computing a projection of the first sensor to the second sensor using the coordinate system of the navigation system based on the computed six-degree of freedom rigid body transformation of the first sensor and second sensor based on the matched one or more reconstructed calibration targets.

16. The vehicle of claim 15, wherein the first sensor comprises a Light Detection And Ranging (LiDAR) sensor, wherein receiving the input from the first sensor comprises reading a LiDAR point cloud, and wherein detecting the plurality of physical calibration targets based on the received input from the first sensor comprises performing LiDAR geometric detection.

17. The vehicle of claim 16, wherein performing LiDAR geometric detection comprises:
defining a geometric shape for each reconstructed calibration target of a first plurality of reconstructed calibration targets based on the LiDAR point cloud;
segregating one or more vertical objects in the first plurality of reconstructed calibration targets based on the defined geometric shapes of the first plurality of reconstructed calibration targets;
clustering the segregated one or more vertical objects;
performing geometric filtering on the clustered segregated one or more vertical objects; and
extracting geometric feature characteristics from the geometric filtered clustered segregated one or more vertical objects.

18. The vehicle of claim 17, wherein the physical calibration targets comprise three-dimensional geometric shapes placed at random locations in the physical surroundings of the vehicle.

19. The vehicle of claim 16, wherein the second sensor comprises a camera, wherein receiving the input from the second sensor comprises receiving an image frame from the camera, and wherein detecting the plurality of physical calibration targets based on the received input from the second sensor comprises detecting one or more markers on each of the plurality of physical calibration targets.

20. The vehicle of claim 19, wherein the physical calibration targets comprise two-dimensional geometric shapes placed at random locations in the physical surroundings of the vehicle and the one or more markers comprise one or more Aruco markers, Aruco boards, or Charuco board and wherein detecting the plurality of physical calibration targets detectable by the second sensor based on the received input from the second sensor further comprises extracting one or more geometric feature characteristics of the each of the plurality of physical targets based on the detecting of the one or more Aruco markers, Aruco boards, or Charuco boards on each of the plurality of physical calibration targets.

* * * * *